UNITED STATES PATENT OFFICE.

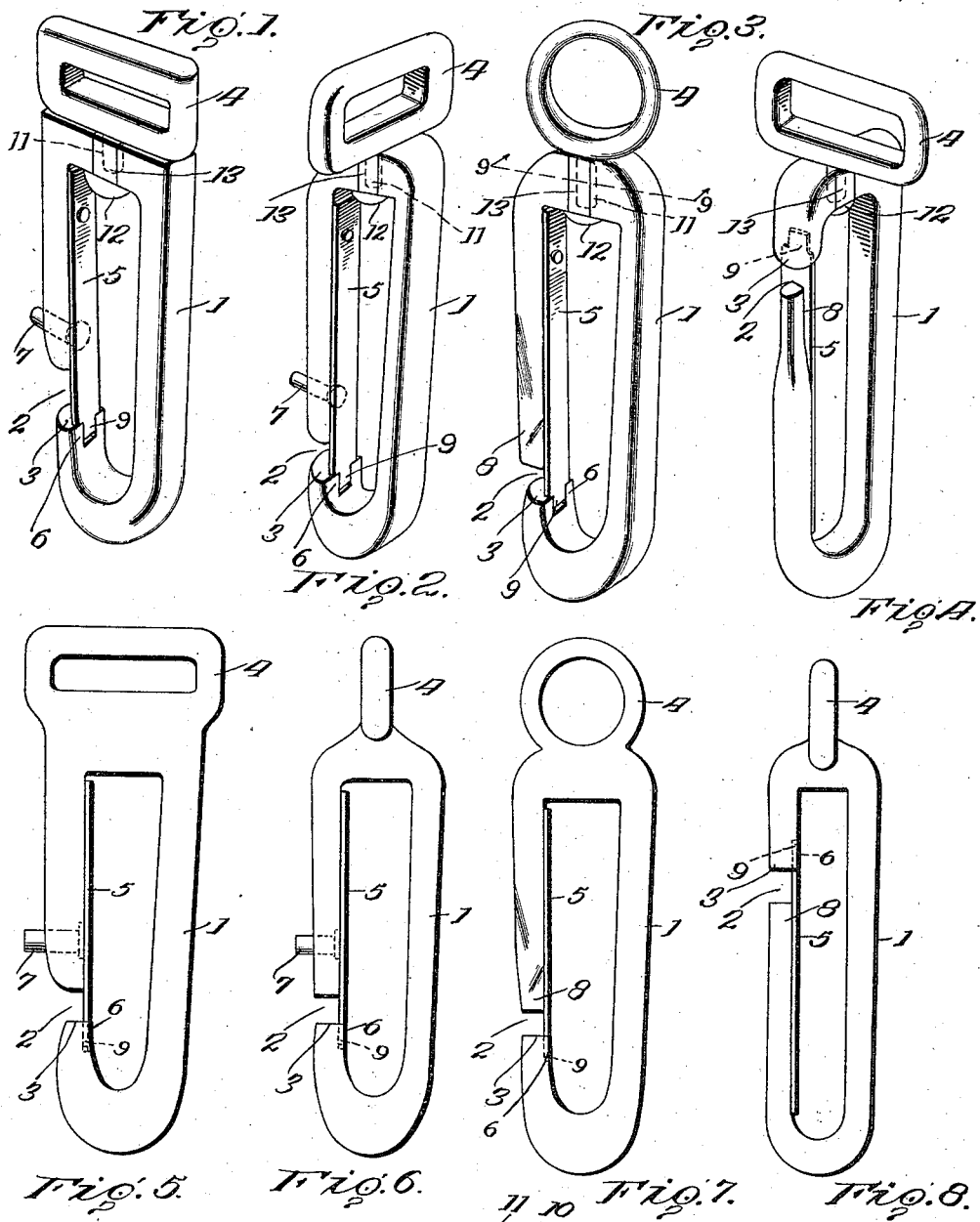

JEFFERSON BARRY, OF AVOCA, MICHIGAN.

SNAP-HOOK.

1,059,812.  Specification of Letters Patent.  Patented Apr. 22, 1913.

Application filed February 6, 1912. Serial No. 675,793.

*To all whom it may concern:*

Be it known that I, JEFFERSON BARRY, citizen of the United States, residing at Avoca, in the county of St. Clair and State of Michigan, have invented certain new and useful Improvements in Snap-Hooks, of which the following is a specification.

This invention relates to snap hooks, and has for its object to provide a simple and durable hook the parts of which are arranged to effectually withstand the strains to which they are subjected when in use.

A further object of the invention is to provide a hook which may be manufactured at small expense and thereby generally cheapen the production of such an article.

Further objects and advantages will appear in the following description, it being understood that various changes in form, proportions and minor details of construction may be resorted to within the scope of the appended claim.

For a full understanding of the invention reference is to be had to the following description and accompanying drawing, in which:

Figure 1 is a perspective view of one form of the hook; Fig. 2 is a perspective view of another form of the hook; Fig. 3 is a perspective view of still another form of the hook; Fig. 4 is a perspective view of still another form of the hook; Fig. 5 is a side elevation of a modified form of the hook as shown in Fig. 1; Fig. 6 is a side elevation of the modified form of hook as shown in Fig. 2; Fig. 7 is a side elevation of a modification of the form of the hook as shown in Fig. 3; Fig. 8 is a side elevation of a modification of the form of hook as shown in Fig. 4; Fig. 9 is a transverse sectional view cut on the line 9—9 of Fig. 3.

Corresponding and like parts are referred to in the following description and indicated in all the views of the accompanying drawing by the same reference characters.

In the accompanying drawing several different forms of the hook are shown and will be explained hereinafter, but these different forms employ features in common which will be pointed out.

In all of the forms of the hook a loop or body portion 1 is provided, said loop having at one side an opening 2, whereby a bill 3 is formed. An eye 4 is connected to the body 1 at one end thereof and the said eye may be integrally formed upon the body or pivotally connected therewith in a manner as will be explained hereinafter. A flat spring 5 is attached to the inner surface of that side of the body at which the opening 2 is provided and the spring bridges the said opening and has an end portion which lies between lugs 6 provided at the inner side of the bill 3 of the body.

In the form of the hook as shown in Figs. 1 and 2 a detent 7 is slidably mounted in that side of the body 1 at which the opening 2 is provided and at its inner end engages the spring 5 and when depressed is adapted to move the free end of the spring away from the bill 3 of the body, whereby a ring may be readily disconnected from the hook.

In the form of the hook as illustrated in Figs. 3 and 4 the side of the body 1 at the opposite side of the opening 2 from the bill 3 is cut away or beveled at its opposite sides as at 8 and the spring 5 is provided at its free end with a tongue 9 which normally lies between the lugs 6 at the end of the bill 3. By providing this tongue 9, the edges of the spring 5 may lie flush with the edges of the major portions of the side of the body 1 to which the said spring is attached, and for this reason the hook is devoid of shoulders or lateral projections at the opposite sides of the bill and at the opposite sides of the portion of the body 1 to which the spring is attached.

When the eye 4 is made integral with the body 1 it may lie in the same plane as the body 1 or may lie in a plane at a right angle to the plane of the said body, or at any other angle. When the eye 4 is pivoted or swiveled at the end of the body 1 it is preferably mounted in the following manner: The body 1 is provided in its side with a recess 10 and in this recess the shank 11 of the eye 4 is journaled, with the head 12 of the shank bearing against the inner side of the end portion of the body 1. After the shank 11 has been inserted in the recess 10 as indicated, a block 13 is forced or otherwise inserted and secured in the outer portion of the recess and closes the same. The inner portion of the block 13 does not have frictional contact with the side of the shank sufficiently to prevent the shank and eye 4 from rotating, but the said block will prevent the shank from moving laterally out of the recess 10 and thereby disengaging the body 1 and one end of the block 13 will be in contact with the head 12 so that the said head will have a bearing upon the body 1 and the block throughout its entire circumferential portion.

Therefore it will be seen that a snap hook of simple structure is provided and that the parts may be cheaply manufactured and when assembled constitute a substantial structure.

Having thus described the invention, what is claimed as new is:

A hook comprising a body having at one side an opening forming a bill, the bill having at its inner side and at its end a recess, a spring attached to the body and normally bridging the opening, the edges of the spring along the major part of its length lying flush with the said edges of the body and the end portion of the body adjacent the opening being reduced, said spring having at its free end a tongue which is less in transverse breadth than the body portion of the spring and which is adapted to be snugly received in the recess provided at the inner side of the bill.

In testimony whereof I affix my signature in presence of two witnesses.

JEFFERSON BARRY. [L. S.]

Witnesses:
NORMAN B. HERBERT,
JEAN HERBERT.

---

Copies of this patent may be obtained for five cents each, by addressing the "Commissioner of Patents, Washington, D. C."